United States Patent
Takemoto et al.

(10) Patent No.: US 7,252,588 B2
(45) Date of Patent: Aug. 7, 2007

(54) SPORT VIDEO GAME MACHINE AND PLAY CONTROL METHOD OF SPORT VIDEO GAME

(75) Inventors: Junichi Takemoto, Tokyo (JP); Norio Egashira, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 898 days.

(21) Appl. No.: 10/148,390

(22) PCT Filed: Dec. 1, 2000

(86) PCT No.: PCT/JP00/08498

§ 371 (c)(1),
(2), (4) Date: May 31, 2002

(65) Prior Publication Data

US 2002/0183104 A1    Dec. 5, 2002

(30) Foreign Application Priority Data

Dec. 1, 1999  (JP)  ................................. 11-342018
Dec. 14, 1999 (JP)  ................................. 11-353802

(51) Int. Cl.
```
A63F 13/00   (2006.01)
A63F 9/24    (2006.01)
A63F 7/07    (2006.01)
G06F 17/00   (2006.01)
G06F 19/00   (2006.01)
A63B 67/14   (2006.01)
```
(52) U.S. Cl. ..................... 463/4; 463/1; 463/2; 463/31; 273/108.1

(58) Field of Classification Search ................ 463/1–5, 463/7, 30–38, 40–43, 49, 53, 54; 273/108, 273/108.1, 317, 317.1–317.6, 329, 371, 246, 273/461
See application file for complete search history.

(56) References Cited

U.S. PATENT DOCUMENTS

| | | | | |
|---|---|---|---|---|
| 5,462,275 A | * | 10/1995 | Lowe et al. | 463/4 |
| 5,601,487 A | * | 2/1997 | Oshima et al. | 463/4 |
| 5,636,920 A | * | 6/1997 | Shur et al. | 700/91 |
| 5,772,512 A | * | 6/1998 | Chichester | 463/40 |
| 5,779,548 A | * | 7/1998 | Asai et al. | 463/31 |

(Continued)

FOREIGN PATENT DOCUMENTS

JP          64-040080      2/1989

(Continued)

*Primary Examiner*—Robert E. Pezzuto
*Assistant Examiner*—Binh-An D. Nguyen
(74) *Attorney, Agent, or Firm*—Rabin & Berdo, P.C.

(57) ABSTRACT

A large "hit range in offense" is applied to a player character 41 on an offense side, and a small "hit range in defense" is applied to player characters 42 and 43 on a defense side. When a ball is free, a "normal hit range" is applied to each player character. As mentioned above, the three hit ranges having different sizes are provided and the applied hit ranges are switched depending on situations. Thus, as compared with a case in which the size of the hit range is constant, pass of the ball is easily successful. Therefore, a beginner, who is strange to a video game machine, can easily pass the ball when the player character in an opponent team steals the ball, and organized offense can be easily performed.

5 Claims, 8 Drawing Sheets

U.S. PATENT DOCUMENTS

| | | | |
|---|---|---|---|
| 5,863,248 A * | 1/1999 | Mine et al. | 463/4 |
| 5,890,906 A * | 4/1999 | Macri et al. | 434/247 |
| 6,102,801 A * | 8/2000 | Sugawara | 463/31 |
| 6,120,374 A * | 9/2000 | Akada et al. | 463/3 |
| 6,126,547 A * | 10/2000 | Ishimoto | 463/42 |
| 6,149,520 A * | 11/2000 | Takatsuka | 463/4 |
| 6,196,917 B1 * | 3/2001 | Mathias et al. | 463/2 |
| 6,280,323 B1 * | 8/2001 | Yamazaki et al. | 463/4 |
| 6,285,407 B1 * | 9/2001 | Yasuki et al. | 348/554 |
| 6,431,982 B2 * | 8/2002 | Kobayashi | 463/4 |
| 6,558,257 B1 * | 5/2003 | Sugawara | 463/31 |
| 6,652,384 B2 * | 11/2003 | Kondo et al. | 463/54 |

FOREIGN PATENT DOCUMENTS

| | | |
|---|---|---|
| JP | 08-305891 | 11/1996 |
| JP | 10-113471 | 5/1998 |

* cited by examiner

SPORT VIDEO GAME MACHINE AND PLAY CONTROL METHOD OF SPORT VIDEO GAME

TECHNICAL FIELD

The present invention relates to a sport video game machine for simulating a ball sport in which a plurality of players are separated into two teams and one team attacks a goal of the other team by using a ball so as to win a goal.

BACKGROUND ART

Many people enjoy sport video games for simulating various ball sports in home video game machines and arcade video game machines. Sport video games for simulating soccer and futsal which is like a small-scaled soccer, become popular. A variety of arcade video game machines, home video game machines, and home video game software, for enjoying the soccer or futsal video games, are widespread to markets. In accordance with the improvement in performance of video game machines, realities of expressions and motions of a player character displayed on a screen are exceedingly improved.

Further, in recent years, two similar video game machines are connected via a communication line (a cable line or a radio line) and a plurality of gamers are separated into two teams. For example, the gamers who play the video game on one video game machine belong to one team, the gamers who play the video game on the other video game machine belong to the other team, and the two teams can meet in a video game. Differently from video game machines in which plays a match against only a CPU, in the above-mentioned video game machines, a plurality of gamers are separated into two teams and the gamers in one team play a match against the gamers in the other team. Consequently, in the above-mentioned latter video game machines, the gamers can enjoy the video game in a manner different from that of the former video game machines.

The video game of the ball sport for playing a match between two teams, such as futsal or soccer is most excited because, primarily, when a player character in one team steals a ball from a player character in the other team, organized play can be enjoyed, for example, pass of the ball is successful or shoot of the passed ball is successful. However, the ball sport has a trend in that the player characters in the one team gather around the player character in the other team, which keeps the ball. Therefore, if the player character in the other team, which keeps the ball, tries to pass the ball to the player character in the same team, the pass of the ball is hardly successful and organized offense is difficult in some cases. In particular, in the case of a beginner, in the one team, who is strange to the operation of the video game machine, if he tries to pass the ball, the ball is promptly stolen by the player character in the other team and the ball moves back and forth between the two teams. Thus, the original enjoyment of the ball sport cannot be enjoyed in many cases.

When the gamer fails to operate the ball and the player character fails to catch the passed ball, the player character goes for the ball in a field by the gamer operation. In this case, when the gamer is strange to the operation of the player character, it takes unnecessary time to go for the ball. For this case, the player cannot enjoy the game though during the game, and this time substantially corresponds to a loss time of the game. Also, when the ball which is not successfully passed by the player character is out of the field, time for restarting the game through a set play such as kick-in or throw-in substantially corresponds to a loss time of the game.

The above time becomes unnecessary time in the case of a game which is played for limited time. Preferably, a ratio of the loss time is reduced in the overall play time of the game.

The present invention is devised based on the above-described background of the art. In other words, it is a first object of the present invention to provide a sport video game machine for simulating a ball sport, in which a gamer can easily execute an organized play and the unnecessary time during the game is reduced as much as possible so that the game can be further enjoyed.

Moreover, the futsal and soccer include plays such as sliding tackle by which a player in one team forcedly steals a ball from a player, in the other team, which keeps the ball. If this play is successful, there is a chance to change the game situation after the time point. To make the play successful, a high-level technique is required to execute the play at the best timing while the guard of the other team is attacked by the one team. Thus, it is difficult that the above play is virtually realized on the video game machine and the gamer can enjoy the feeling (reality) similar to the play in an actual play.

The present invention is devised based on the above-described background of the art. In other words, it is a second object of the present invention to enable a gamer to sufficiently enjoy the reality when a player character in one team forcedly steals a ball from a player character in the other team, which keeps the ball, in the case of the sliding tackle in futsal and so on.

DISCLOSURE OF THE INVENTION

To accomplish the first object, according to a first invention, there is provided a sport video game machine for simulating a ball sport in which a plurality of player characters are separated into two teams and one team attacks a goal of the other team with a ball, wherein the size of a hit range used for collision determination of each player character is changed depending on situations of a video game.

To accomplish the first object, according to a second invention, in the sport video game machine of the first invention, at least two hit ranges having different sizes are set in advance as said hit ranges, a wide hit range as a first hit range is applied to the player character in the one team, which keeps the ball and attacks the goal of the other team, and a narrow hit range as a second hit range is applied to the player character in the other team, which is attacked by the one team that keeps the ball.

To accomplish the first object, according to a third invention, there is provided a sport video game machine for simulating the motion of a ball used for a ball sport in which a plurality of player characters are separated into two teams and one team attacks a goal of the other team with a ball, based on a dynamic equation including a friction factor as a parameter, wherein a normal friction factor is used when the moving ball is close to a pass target coordinate in the case in which the player character in the one team passes the ball to the player character in the same team, and the friction factor is switched to be a friction factor higher than said normal friction factor when the moving ball passes through the pass target coordinate.

To accomplish the first object, according to a fourth invention, there is provided a control method of a sport video game machine for simulating a ball sport in which a plurality of player characters are separated into two teams and one team attacks a goal of the other team with a ball, said method comprising the step of: changing the size of a hit range used for collision determination of each player character depending on situations of a video game.

To accomplish the first object, according to a fifth invention, the control method of the sport video game machine of the fourth invention, further comprises the steps of: setting at least two hit ranges having different sizes in advance as said hit ranges; applying a wide hit range as a first hit range to that of the player character in the one team, which keeps the ball and attacks the goal of the other team; and applying a narrow hit range as a second hit range to that of the player character in the other team, which is attacked by the one team that keeps the ball.

To accomplish the first object, according to a sixth invention, there is provided a control method of a sport video game machine for simulating the motion of a ball used for a ball sport in which a plurality of player characters are separated into two teams and one team attacks a goal of the other team with a ball, based on a dynamic equation including a friction factor as a parameter, said method comprising the steps of: using a normal friction factor when the moving ball is close to a pass target coordinate in the case in which the player character in the one team passes the ball to the player character in the same team; and switching the friction factor to be a friction factor higher than said normal friction factor when the moving ball passes through the pass target coordinate in the case in which the player character in the one team passes the ball to the player character in the same team.

To accomplish the first object, according to a seventh invention, there is provided a computer-readable recording medium for recording a program of a sport video game for simulating a ball sport in which a plurality of player characters are separated into two teams and one team attacks a goal of the other team with a ball, wherein said medium records the program which allows a computer to implement a function for changing the size of a hit range used for collision determination of each player character depending on situations of the sport video game.

To accomplish the first object, according to an eighth invention, there is provided a computer-readable recording medium for recording a program of a sport game for simulating the motion of a ball used for a ball sport in which a plurality of player characters are separated into two teams and one team attacks a goal of the other team with a ball, based on a dynamic equation including a friction factor as a parameter, wherein said medium records the program which allows a computer to implement a function for: using a normal friction factor when the moving ball is close to a pass target coordinate in the case in which the player character in the one team passes the ball to the player character in the same team; and switching the friction factor to be a friction factor higher than said normal friction factor when the moving ball passes through the pass target coordinate in the case in which the player character in the one team passes the ball to the player character in the same team.

To accomplish the second object, according to a ninth invention, there is provided a sport video game machine for simulating a ball sport in which a plurality of player characters are separated into two teams and one team attacks a goal of the other team with a ball, wherein when the player character in the one team makes a play in which the player character in the one team forcedly steals the ball from the player character in the other team which keeps the ball in a video game, a plurality of collision areas to be applied to determine whether or not said play is successful are set, and the applied collision areas are changed depending on operation contents of a gamer for said play.

To accomplish the second object, according to a tenth invention, in the sport video game machine of the ninth invention, said ball sport corresponds to futsal or soccer, said play corresponds to sliding tackle, said operation contents correspond to an input value which is inputted by gamer's operation of analog input means when the gamer allows the operated player character to sliding tackle the ball.

To accomplish the second object, according to an eleventh invention, in the sport video game machine of the tenth invention, said plurality of collision areas are fan-shaped, when said input value is over a predetermined level, a first collision area having a radius $r_1$ and a central angle $\theta_1$ is applied, and when said input value is equal to said predetermined level or less, a second collision area having a radius $r_2$ ($<r_1$) and a central angle $\theta_2$ ($\geq \theta_1$) is applied.

To accomplish the second object, according to a twelfth invention, there is provided a play control method of a sport video game for simulating a ball sport in which a plurality of player characters are separated into two teams and one team attacks a goal of the other team with a ball, said method comprising the steps of: when the player character in the one team makes a play in which the player character in the one team forcedly steals the ball from the player character in the other team which keeps the ball in a video game, setting a plurality of collision areas to be applied to determine whether or not said play is successful; and changing the applied collision areas depending on operation contents of a gamer for said play.

To accomplish the second object, according to a thirteenth invention, in the play control method of the sport video game of the twelfth invention, said ball sport corresponds to futsal or soccer, said play corresponds to sliding tackle, said operation contents correspond to an input value which is inputted by gamer's operation of analog input means when the gamer allows the operated player character to sliding tackle the ball.

To accomplish the second object, according to a fourteenth invention, in the play control method of the sport video game of the thirteenth invention, said plurality of collision areas are fan-shaped, when said input value is over a predetermined level, a first collision area having a radius $r_1$ and a central angle $\theta_1$ is applied, and when said input value is equal to said predetermined level or less, a second collision area having a radius $r_2$ ($<r_1$) and a central angle $\theta_2$ ($\geq \theta_1$) is applied.

To accomplish the second object, according to a fifteenth invention, there is provided a computer-readable recording medium for recording a program of a sport game for simulating a ball sport in which a plurality of player characters are separated into two teams and one team attacks a goal of the other team with a ball, wherein said medium records the program which allows a computer to implement a function for: when the player character in the one team makes a play in which the player character in the one team forcedly steals the ball from the player character in the other team which keeps the ball in a video game, setting a plurality of collision areas to be applied to determine whether or not said play is successful; and changing the applied collision areas depending on the level of said play.

BEST MODE FOR CARRYING OUT THE INVENTION

Best modes for carrying out the present invention will be described hereinafter with reference to the drawings.

FIRST EMBODIMENT

A first embodiment of the present invention will be described with reference to the drawings.

Figure 1:
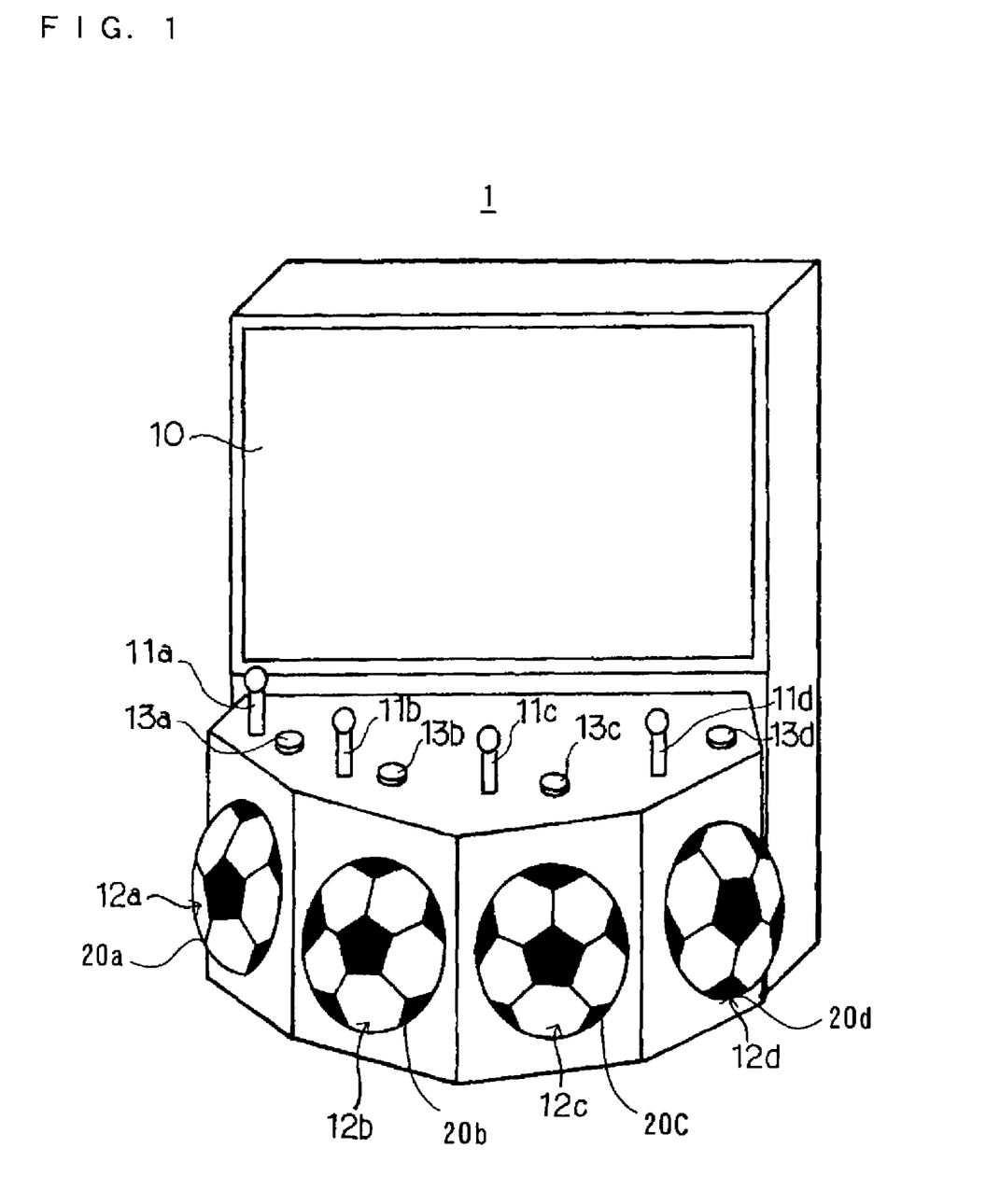
FIG. 1 is a perspective view showing the appearance of the overall sport video game machine according to first and second embodiments of the present invention.

Before description of a main portion of the first embodiment, the outline of the overall sport video game machine will be described with reference to FIG. 1. FIG. 1 is a perspective view showing the appearance of the overall sport video game machine.

A sport video game machine 1 in FIG. 1 is a video game machine of a game dedicated for futsal which is like a small-scaled soccer. One team contains five player characters including a goal keeper. When the single video game machine 1 in FIG. 1 is used, maximum four gamers can play the video game. Each gamer can operate the motion of the player characters except for the goal keeper, and the goal keeper is always controlled by a CPU. An operation of the player character, which is not operated by the gamer, is controlled by a CPU in accordance with a predetermined algorithm.

Further, the video game machine 1 shown in FIG. 1 has a communication match mode. In the communication match mode, the two video game machines 1 are connected via a communication line, maximum eight gamers are separated into two teams of the respective video game machines 1, and the video game match is played by using the two video game machines 1. In this case, the gamers, who operate one video game machine 1, operate the player character which belongs to one team of the one video game machine 1.

The video game machine 1 comprises a screen 10 for displaying a moving image or a still image of game contents and other necessary items at a position which is determined in consideration of the height of gamer's eye. An operating unit under the screen 10 comprises four operating panels a, b, c, and d in consideration of the case of a play operation of the four gamers. The operating panels a, b, c, and d have levers 11 (11a, 11b, 11c, and 11d), kick input units 12 (12a, 12b, 12c, and 12d), and buttons 13 (13a, 13b, 13c, and 13d), respectively. Each gamer stands before his own operating panel and operates the lever 11, the kick input unit 12, and the button 13. The button 13 is used for an operation for switching the operated player character during the game and so on.

When the operated player character simply moves or keeps and dribbles a ball, instruction contents, which are operated by the lever 11, include a moving direction or a moving speed of the player character. When the operated player character kicks the ball to pass or shoot the ball, the instruction contents include a fly direction of the kicked ball. In the first embodiment, an analog lever is used as the lever 11. Thus, a moving direction of the player character and a moving direction of the ball can be continuously changed.

The kick input unit 12 is provided at a lower portion of the video game machine 1. Mainly, operations of the kick input unit 12 are instructions for starting play operations such as pass, shoot, and sliding tackle, which are played by the operated player character, and speed control of the ball kicked through the pass and the shoot. The kick input unit 12 comprises a pseudo ball 20 for kicking the ball by gamer's foot, like the actual futsal. The pseudo ball 20 is hemispherical with substantially the same radius as that of an actual ball. A material similar or substantially similar to the futsal ball is used as a material of the surface of the pseudo ball 20. Obviously, a pattern of the pseudo ball 20 is subsequently similar to that of the actual ball.

Hereinbelow, a main portion of the first embodiment will be described. In the video game machine for simulating the ball sport, a process for determining a collision is executed, that is, determining whether or not the player character in one team can be successfully caught up, when the ball is passed to the player character in the one team from the player character in the one team and when the player character in the one team steals the ball which is passed by the player character in the other team.

Figure 2:
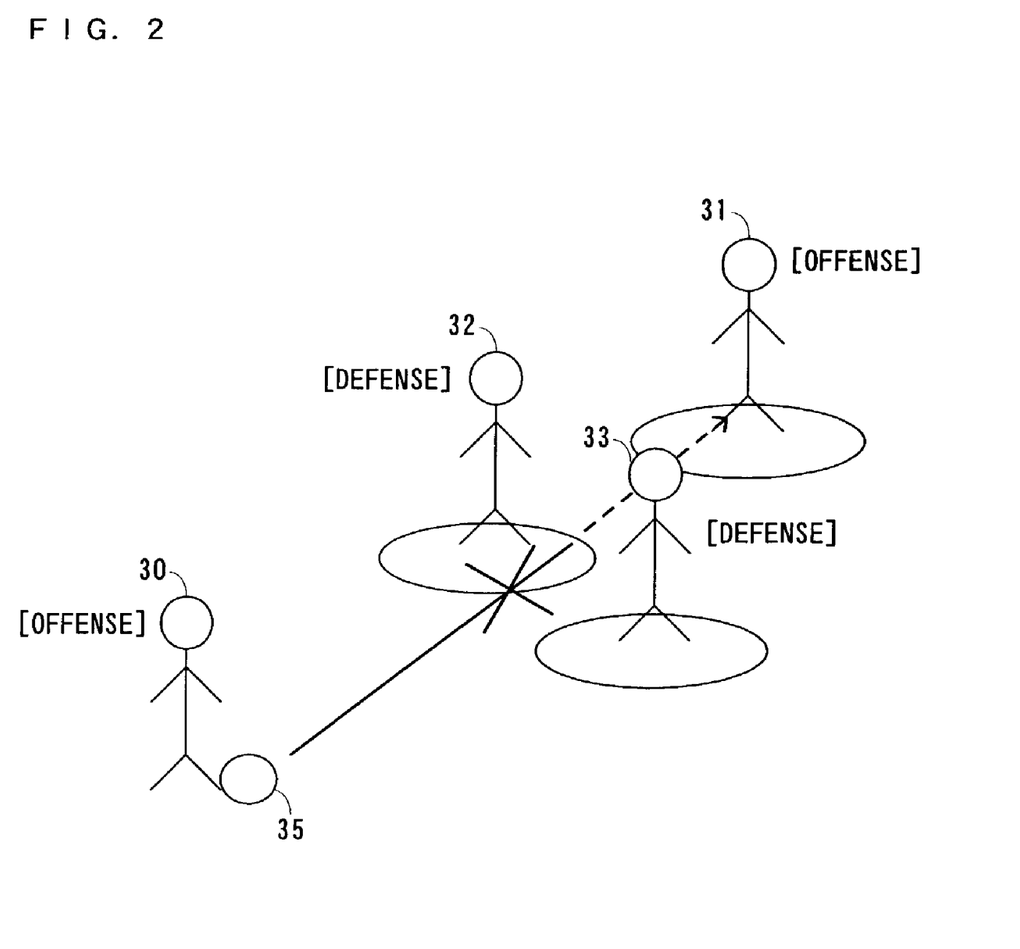
FIG. 2 is a diagram showing a case of using a hit range having a predetermined size of collision determination.

The collision determination uses a circular determination area which is called a hit range shown in FIG. 2. The hit range is virtually set in the video game machine and is not displayed on a screen during the game. The hit range is circular-shaped with each player character as center, and is moved in accordance with the movement of the player character. In the process for the collision determination, by using the hit range, the ball is not caught up when it is determined that the moving ball does not pass through the hit range, and the ball is caught up by the player character within the hit range when it is determined that the ball passes through the hit range.

In the actual futsal or soccer, when a player in one team passes the ball to the player character in the same team and the passed ball is stolen by a player in the one team from that in the other team, it is necessary that the player is close to the moving ball at the best timing. Therefore, obviously, the collision determination is rational as compared with operations in actual ball sports.

FIG. 2 shows an example in which when a player character 30 in one team on an offense side passes the ball to a player character 31 in the same team, player characters 32 and 33 in the other team (on a defense side) follows a ball 35 along a moving route thereof so as to steal the ball 35. In this case, since the ball 35 kicked as a pass enters the hit range of the player character 32 on the defense side, the player character 32 on the defense side catches up the ball 35 and the pass on the offense side is not successful.

Incidentally, in the first embodiment, it is assumed that the "offense side" corresponds to one team which keeps the ball and attacks the other team within an area of the other team, over the center line. In this case, the "defense side" corresponds to the other team.

In the conventional sport video game machines for simulating the ball sport, the size of the hit range used for the above-mentioned collision determination is predetermined every video game machine. In this case, if the hit range is wide, the ball can be easily caught up when the ball passed by the player character in the one team is caught up by the player character in the same team, whereas the ball passed by the one team can be easily stolen by the player character in the other team as the ball moves. On the other hand, if the hit range is narrow, a danger for stealing the ball by the player character in the other team is reduced during the pass and, however, the ball can be hardly caught up well when the ball passed by the player character in the one team is caught up by the player character in the same team.

Thus, the pass is hardly successfully continued irrespective of the size of the hit range. In particular, when the player character in the one team attacks the other team in an area of the other team over the center line, the player character in the one team is sharply marked by the player character in the other team and the pass is not successful. If the ball of the one team is not stolen by the other team, the ball passed by the player character in the one team is not caught up well by the player character in the same team and the ball passes the player character. While the ball is followed to be caught up, limited game time unnecessarily passes.

In the first embodiment, three hit ranges of a "normal hit range", a "hit range in the offense" and a "hit range in the defense" are provided. The "hit range in the offense" is the widest, the "hit range in the defense" is the narrowest, and the "normal hit range" is intermediate between the "hit range in the offense" and the "hit range in the defense". In the first embodiment, the three hit ranges are switched at proper timings depending on the game situation.

Figure 3:
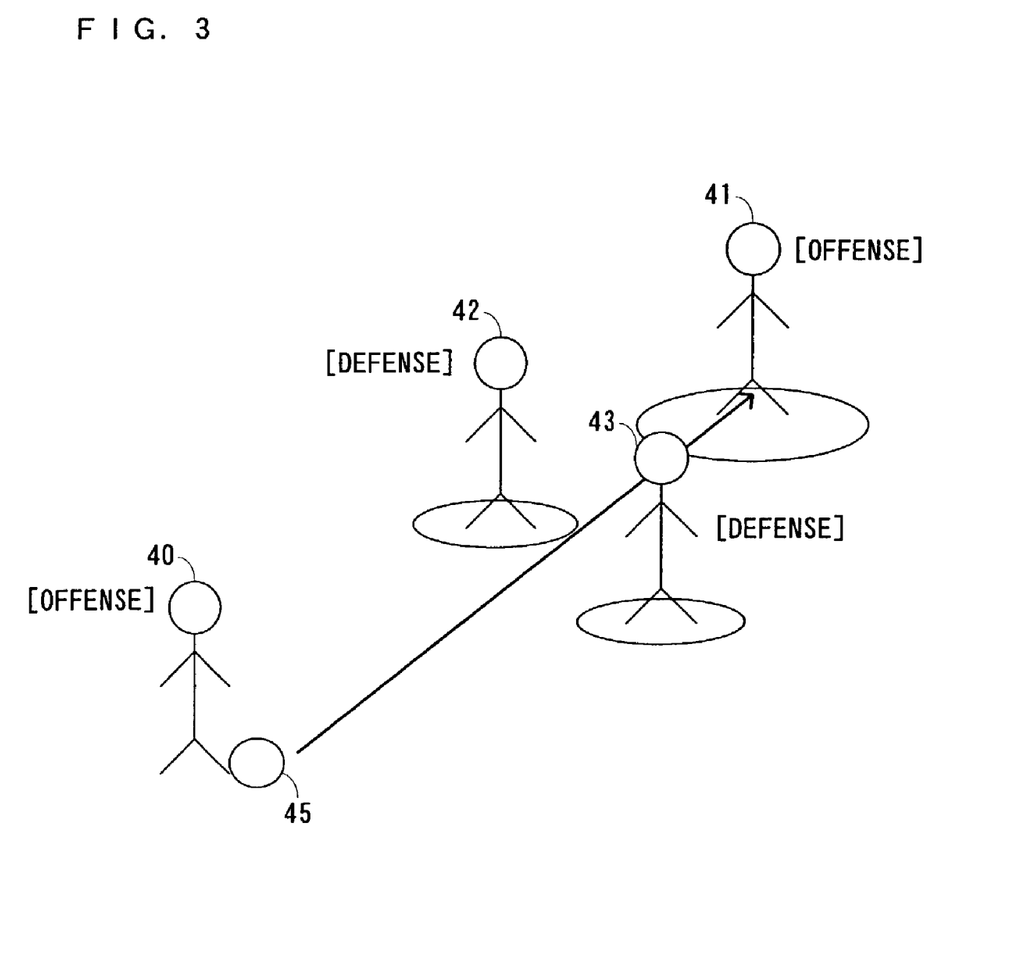
FIG. 3 is a diagram showing a case in which, in the case of collision determination, a large "hit range upon offense" is applied to a player character on the offense side and a small "hit range upon defense" is applied to a player character on the defense side.

FIG. 3 shows a status in which when a player character 40 in one team (on the offense side), which attacks an area of the other team while keeping the ball, passes the ball to a player character 41 in the one team, player characters 42 and 43 in the other team (on the defense side) follow a ball 45 along a moving route thereof so as to steal the ball 45, similarly to FIG. 2. In the first embodiment, in the situation, the wide "hit range in the offense" is applied to the player character 41 on the offense side, and the narrow "hit range in the defense" is applied to the player characters 42 and 43 on the defense side.

As shown in FIG. 3, in the case of applying the different hit ranges, the positions of the player characters 40 to 43 and the moving route of the ball 45 are the same as those in FIG. 2. However, in FIG. 3, the ball 45 kicked as a pass does not enter the hit ranges of the player characters 42 and 43 on the defense side and the ball is not caught up by the player characters on the defense side. Since the hit range in the offense of the player character 41 is wide, the player character 41 easily catches up the ball 45 which is passed by kick of the player character 40 in the one team. As a consequence, finally, the pass on the offense side is successful in FIG. 3.

Although FIG. 3 shows the example in which the pass is successful, the pass is not successful and the ball 45 is stolen by the player character on the defense side and, then, the one team, which is on the defense side so far, shifts to attack the other team. In accordance with this, the "normal hit range" is applied to the hit range of each player character. Thereafter, when the player character which steals the ball 45 is over the center line and enters the field of the opponent team, the "hit range in the defense" is applied to the player characters 40 and 41 and the "hit range in the offense" is applied to the player characters 42 and 43.

Further, when the ball 45 exists any of the areas in both the teams and is in a free state in which it is kept by no player character in the two teams, the "normal hit range" is applied to each player character.

As mentioned above, the three different hit ranges of the "normal hit range", the "hit range in the offense", and the "hit range in the defense" are provided and the hit range is switched depending on the situation. Thus, the pass is easily successful, as compared with the case in which the hit range is constant. The beginner who is strange to the operation of the video game machine easily passes the ball even if the player character in the opponent team tries to steal the ball, thus easily leading to the organized offense. As compared with the conventional video game machines, the gamers can further enjoy the original enjoyment of the sport video game.

Figure 4:
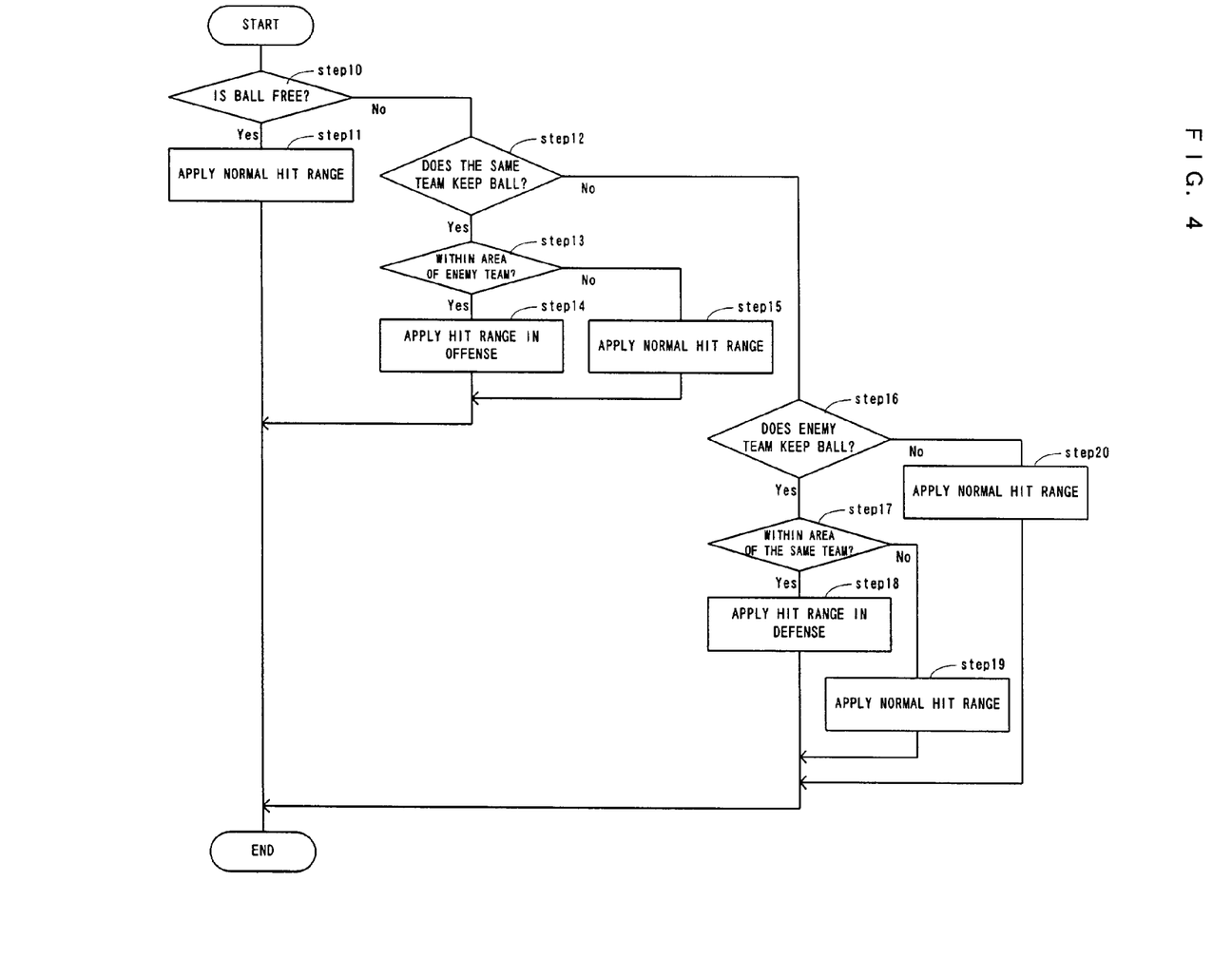
FIG. 4 is a flowchart showing a switching process of the hit ranges.

FIG. 4 is a flowchart showing a process for switching the hit ranges. This process is executed for each player character at, for example, one interval (corresponding to 1/60 sec).

First, it is determined whether or not the ball is free (step 10). If it is determined that the ball is free, the normal hit range is applied to the player character in one team (step 11). If it is determined in step 10 that the ball is not free, it is determined whether or not the player character in the same team keeps the ball (step 12). If it is determined in step 12 that the player character in the same team keeps the ball, it is determined whether or not the player character in the one team is over the center line and enters the area of the other team (step 13). If it is determined that the player character in the one team enters the area of the other team, the "hit range in the offense" is applied (step 14). If it is determined in step 13 that the player character in the one team dose not enter the area of the other team, the "normal hit range" is applied (step 15).

On the contrary, if it is determined in step 12 that the player character in the one team does not keep the ball, it is determined whether or not the player character in the other team keeps the ball (step 16). If it is determined in step 16 that the player character in the other team keeps the ball, it is determined that whether or not the player character in the other team is over the center line and enters the area of the one team so as to attack the one team (step 17). If it is determined in step 17 that the player character in the other team enters the area of the one team so as to attack the one team, the "hit range in the defense" is applied (step 18). If NO in step 17, the "normal hit range" is applied (step 19). If it is determined in step 16 that the player character in the other team does not keep the ball, the "normal hit range" is applied (step 20).

Next, a description is given of a process for reducing the unnecessary time as much as possible during the game within the limited game time. As described above, when the gamer fails the operation of the player character and the player character fails to catch the passed ball and goes for the ball, or when the ball, which is not successfully passed, is out of the field, for time until which the player character follows and catches up the ball and for time until which the game is restarted by the set play such as kick-in, the gamer does not enjoy the video game. The limited game time is wasted.

Then, in the first embodiment, when the player character fails to successfully catch the passed ball or the ball is free, the ball is hardly rotated by a method, which will be described later. Thus, the time for which the player character goes for the ball whose pass is failed is reduced and the ball whose pass is failed or which is free is prevented from being out of the field.

In the sport video game machine, a displayed ball is simulated by substituting proper parameters for a dynamic equation which describes natural phenomena so that the ball moves like a real ball used for actual futsal or soccer. One of the parameters is a friction factor when the ball comes contact into and moves on the ground. If the friction factor is high, it is difficult that the ball rotates. On the other contrary, if the friction factor is low, it is easy that the ball rotates. In general, the friction factor is set to be a value at which the movement of the ball is seen to be most normal. However, when the player character fails to catch up the ball or when the ball is kicked in a direction in which no player character exists and then the ball is free, the friction factor is switched to be a higher value.

Next, a standard in the case of switching the friction factor will be described. In the video game machine, a pass target coordinate is set close to the player character which will catch the passed ball and on a line along a direction of the kicked ball, when the player character passes the ball. The passed ball is moved to pass through the pass target coordinate. The ball is kicked by the player character in the one team and then is moved to close to the pass target coordinate until the player character in the one team catches up the ball. However, when the player character cannot catch up the ball and ball is free, the ball passes through the pass target coordinate and becomes apart from the pass target coordinate. The video game machine determines whether or not the ball is close to or more apart from the pass target coordinate and the friction factor is switched.

Even if the ball kicked by the player character in the one team is moved in a direction in which no player character in the same team exists, that is, the ball is in a no-search status, the pass target coordinate is set. In this case, when the ball passes through the set pass target coordinate, the video game machine determines that the ball is free and the friction factor is switched to be one having a high value.

Figure 5:
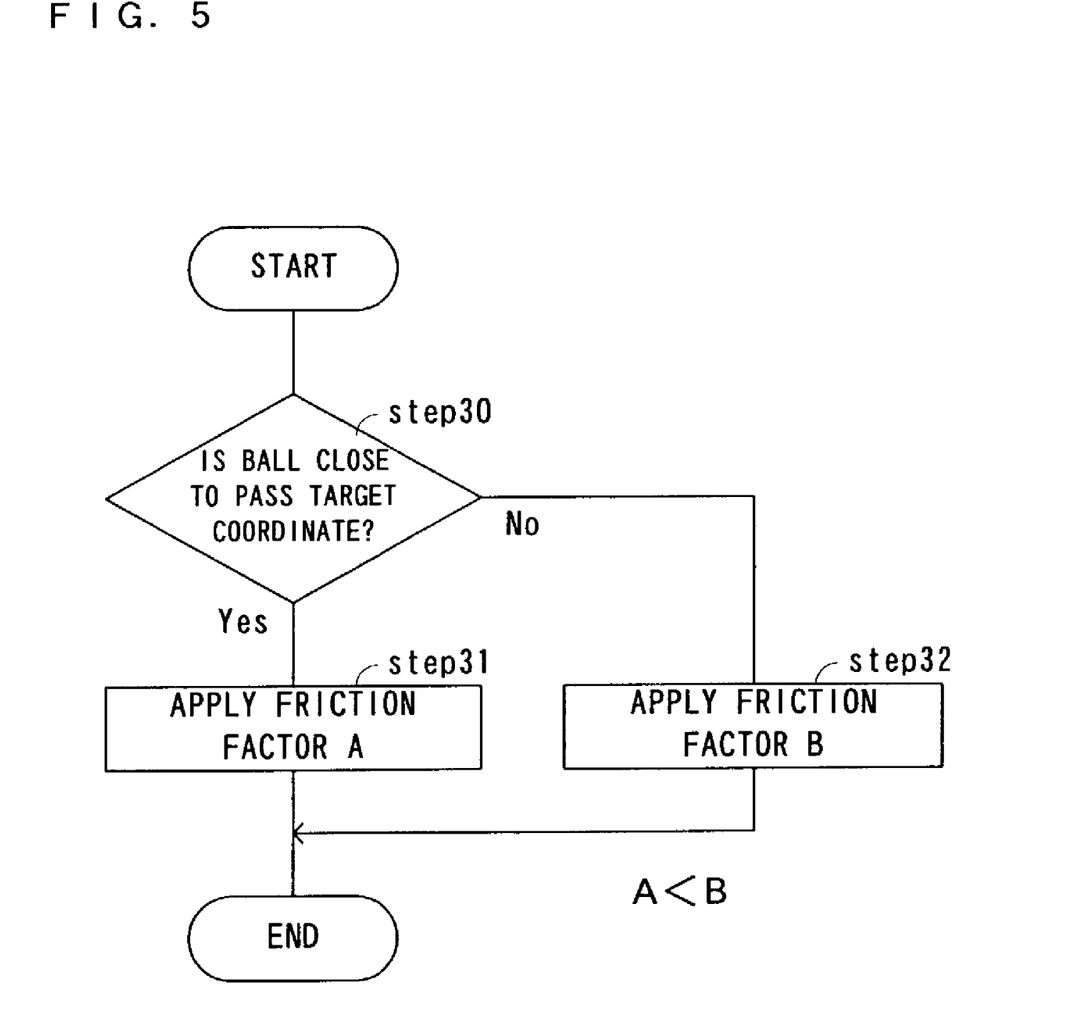
FIG. 5 is a flowchart showing a switching process of friction factors.

FIG. 5 is a flowchart showing a process for switching the friction factors. This process is executed every interval. In the process, first, it is determined whether or not the ball is close to the pass target coordinate (step 30). The determination in step 30 is executed by checking a changed distance between the position of the ball and the pass target coordinate. If it is determined that the ball is close to the pass tart coordinate, a friction factor A is applied (step 31). If it is determined that the ball is apart from the pass target coordinate, a friction factor B is applied (step 32). Herein, a relationship of A<B is established.

Then, if the gamer fails to operate the player character and the player character does not catch up the ball, the time for going for the ball which cannot be caught up by the player character is reduced. If the player character in the one team kicks the ball in a direction in which no player character in the same team exists, infrequently, the ball is over a side line or a goal line and is out of the field. Therefore, the time for substantially stopping the game can be reduced.

The present invention is not limited to the first embodiment. Although the sport video game machine is dedicated for the futsal in the above description, the present invention can be applied to sport video game machines for simulating sports, such as soccer, basketball and handball, in which a plurality of players are separated into two teams and one team attacks the other team to shoot the ball to the goal with the ball.

In addition, the present invention can be embodied by recording a computer program for implementing the above-described game contents or functions to a recording medium. The recording medium includes a magnetic tape, a flexible disk, an optical disk such as a CD-ROM or DVD, a magneto-optical disk such as an MO, etc.

In the determination of the collision, the used hit range is changed depending on the game status. For example, a wide hit range is applied to the player character in one team which attacks the other team to shoot a ball to the goal, and a narrow hit range is applied to the player character in one team which is attacked by the other team to shoot the ball to the goal. Thus, it is easy to make the pass of one team which attacks the other team to shoot the ball to the goal, successful. A beginner, who is strange to the game or the operations of the player character, easily can perform the organized play and the original enjoyment of the video game can be improved.

If the moving ball is close to the pass target coordinate when a player character in one team passes the ball to a player character in the same team, the normal friction factor is used. If the moving ball passes through the pass target coordinate, the friction factor is switched to that having a higher value than that of the normal friction. Even if the pass of the ball is not successful and the ball cannot be caught up, brake power applied to the ball is increased and the ball is fast stopped, thus reducing the time for going for the ball. If the ball is free when the ball is not caught up or the ball is kicked in the direction in which no player character exists, infrequently, the ball is out of the field and the game is stopped. Accordingly, the time for substantially stopping the game, for which the gamer cannot enjoy the game during the limited game time, can be reduced.

SECOND EMBODIMENT

A second embodiment of the present invention will be described hereinbelow. Incidentally, a perspective view showing the overall sport video game machine according to the second embodiment is the same as that of the first embodiment. Accordingly, a description of the overall the machine of the second embodiment is given with reference to FIG. 1 of the first embodiment and a detailed description of overlapped portions is omitted.

Figure 6:
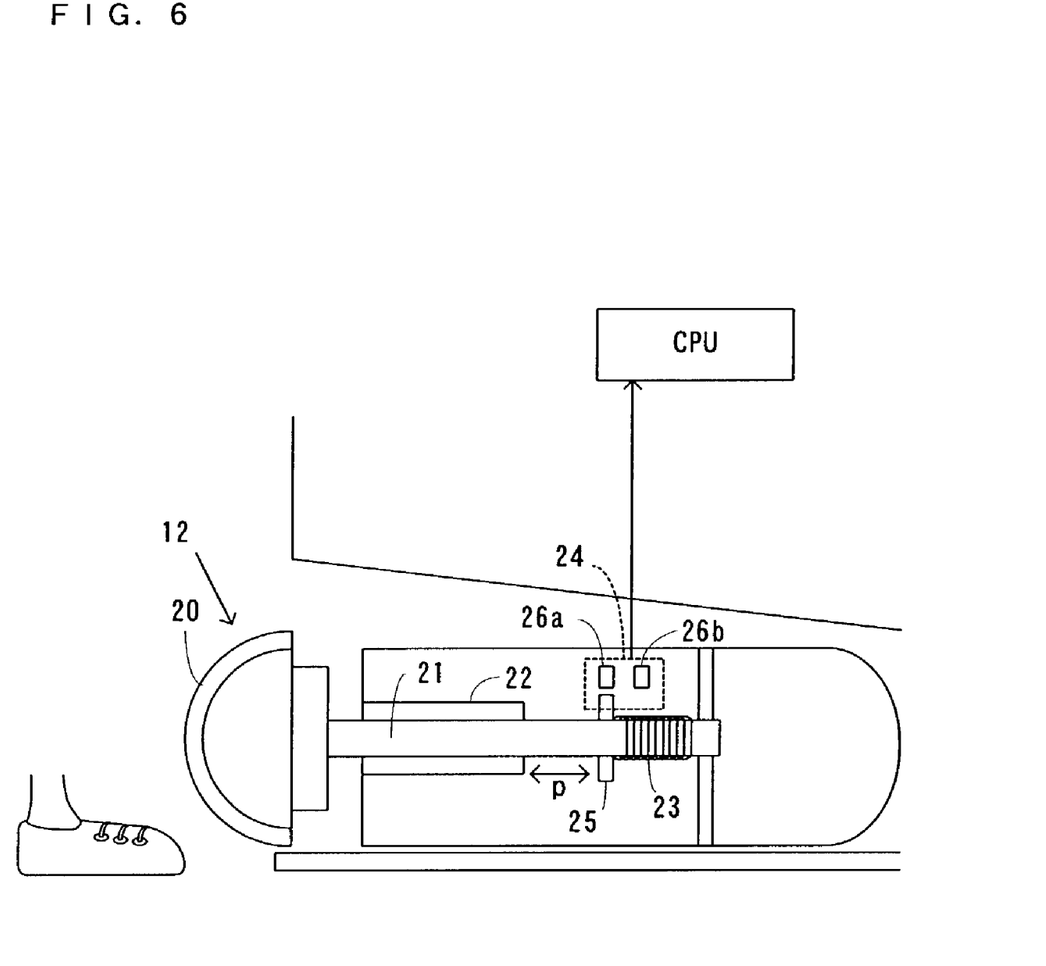
FIG. 6 is a cross-sectional view showing the structure of a kick input unit of the sport video game machine shown in FIG. 1.

FIG. 6 is a cross-sectional view showing the structure of the kick input unit 12 of the sport video game machine shown in FIG. 1.

Before description of a main portion of the second embodiment, the outline of the overall video game machine according to the second embodiment will be described. The description of the second embodiment uses "futsal" which is like a miniaturized soccer, as an example. A rule of the futsal is substantially similar to that of the soccer, except for the small number of players, and the gamer can play the game with the same sense as that of the soccer.

In the game of the second embodiment, a team which attacks a right goal on the screen (right-attack team) meets a team which attacks a left goal on the screen (left-attack team). A uniform worn by the player character on the screen is different depending on the team. The team can be discriminated depending on the uniform. Each team contains five player characters and a gamer operates the four player characters except for a goal keeper. When the single video game machine 1 in FIG. 1 is used, maximum four gamers can play the video game. An operation of the player character, which is not operated by the gamer, is controlled by a CPU in accordance with a predetermined algorithm. Incidentally, the CPU always controls the goal keeper.

During a play time of the game, in principle, an image in the field indicates an image when the field is looked down in a oblique direction from the side. A magnification can be varied depending on situations such as a situation in which a viewpoint is set with a wide angle view and a wide range is displayed so that both the goals are displayed or a situation in which only a limited narrow range around the player character in the field is enlargedly displayed.

The four operating panels a, b, c, and d are individually colored. For example, "red" is assigned to the operating panel a, "yellow" is assigned to the operating panel b, "blue" is assigned to the operating panel c, and the "green" is assigned to the operating panel d.

When the operated player character simply moves or keeps and dribbles a ball, instruction contents, which are operated by the lever 11, include a moving direction or a moving speed of the player character. When the operated player character keeps the ball, the instruction contents include a fly direction of the ball which is kicked by the player character to pass or shoot the ball. Further, as described hereinafter, when the player character in one team steals the ball by a sliding tackle, from the player character in the other team which exists near the player character in the one team and keeps ball, a direction of the inclined lever 11 indicates a sliding direction.

In the second embodiment, an analog lever is used as the lever 11. In the analog lever, two volumes (an x-volume and a y-volume) having resistances changed depending the rotations of shafts thereof, are arranged so that the shafts are perpendicular to each other. The bottom of shaft of the lever 11 is connected to the shafts of the x-volume and the y-volume by a gear or the like. The shafts of the x-volume and the y-volume are rotated in accordance with an inclined direction of the lever 11 and an angle of inclination thereof. If the lever 11 is inclined in any direction, both the x-volume and the y-volume are rotated corresponding to the amount of inclinations thereof.

The CPU, which controls the overall video game machine, always detects the resistances of the x-volume and the y-volume at predetermined periodic intervals. The CPU calculates vectors based on the resistances and recognizes the inclined angle and the inclined direction of the lever 11. In accordance with continuous change in the inclined angle and inclined direction of the lever 11, rotational angles of the shafts and the resistances of the x-volumes and the y-volume are continuously changed. Therefore, the CPU continuously recognizes the inclined direction and inclined angle.

The kick input unit 12 is provided at a lower portion of the video game machine 1. Mainly, operations of the kick input unit 12 are instructions for starting play operations such as pass, shoot and sliding tackle which are made by the operated player character and speed control of the ball kicked through the pass and the shoot. The kick input unit 12 comprises a pseudo ball 20 for kicking the ball by gamer's foot like the actual futsal.

Referring to FIG. 6, a stick shaft 21 is provided at the back of the pseudo ball 20. The hemispherical pseudo ball 20 is fixed at the left end of the shaft 21. The shaft 21 is supported by a bearing 22 and can be moved in a direction shown by an arrow p in the horizontal direction. The shaft 21 is inserted in a spring 23. One end of the spring 23 is fixed to the shaft 21 and the other end thereof is fixed to the main body of the video game machine. The spring 23 energizes the shaft 21 in the left direction of FIG. 6, and the pseudo ball 20 and the shaft 21 are positioned at the leftmost side in the normal state. In this case, a hemispherical portion of the pseudo ball 20 is projected from a lower portion of the video game machine to be opposed to the toe of the gamer, as shown in FIG. 1.

When the gamer kicks the pseudo ball 20, the pseudo ball 20 is moved in the right direction (in the direction toward the back of the video game machine) in FIG. 6 at a speed corresponding to a kick power. The pseudo ball 20 and the shaft 21 integrated therewith are moved to the right while being supported by the bearing 22. When the pseudo ball 20 and the shaft 21 are moved at some degree, repulsive power of the spring 23 is increased and the pseudo ball 20 and the shaft 21 are energized to the left and are returned to the original position.

The kick input unit 12 comprises a speed sensor 24 for detecting a displacing speed of the shaft 21. The speed sensor 24 comprises a reflecting member 25 which is mounted on the shaft 21, and two optical sensors 26a and 26b provided along a longitudinal direction of the shaft 21. The displacing speed of the shaft 21 is calculated based on time for which the reflecting member 25 passes between the optical sensors 26a and 26b. As the displacing speed is higher, the pseudo ball 20 is strongly kicked. The CPU controls the speed of the ball which is kicked on the screen when the ball is passed or shot, based on the calculated displacing speed.

The button 13 is used, mainly when the player character which is operated by the gamer is changed during the game. When the player character in one team which is operated by the gamer, is apart from the ball, by using the function of the button 13, the player character in the same team (player character controlled by the CPU) near the ball can be operated by the gamer. Thus, the limited game time can be effectively used.

Next, a main portion will be described according to the second embodiment. As mentioned above, in the video game machine 1, similarly to the actual futsal or soccer, when the player character in the opponent team, which keeps the ball, exists near the player character which is operated by a gamer, the ball is sliding tackled and the ball is stolen from the opponent team. When the gamer allows the player character which is operated by him to sliding tackle the ball, the sliding tackle direction is instructed by a direction of the inclined lever 11. The start operation of the sliding tackle is instructed by kicking the pseudo ball 20 with a power over the minimum level which is determined to be a kick. If the gamer who operates the player character which does not keep the ball kicks the pseudo ball 20 with a power over a predetermined level, a request for the sliding tackle is issued. Then, an image of the player character is displayed on the screen to slide the ball in the direction of the inclined lever 11, irrespective of the success or failure of the sliding tackle.

When the gamer allows the player character, which is operated by him, to sliding tackle the ball, if a distance between the player character and the ball which is kept by the player character in the opponent team, the direction of the inclined lever 11, and a kick power of the pseudo ball 20 are proper, the sliding tackle is successful. Thereafter, the player character, which sliding tackled the ball, newly keeps the ball. If the above conditions of the distance, the direction, and the kick power are not satisfied, the sliding tackle is failed and the original player character keeps the ball.

Figure 7:
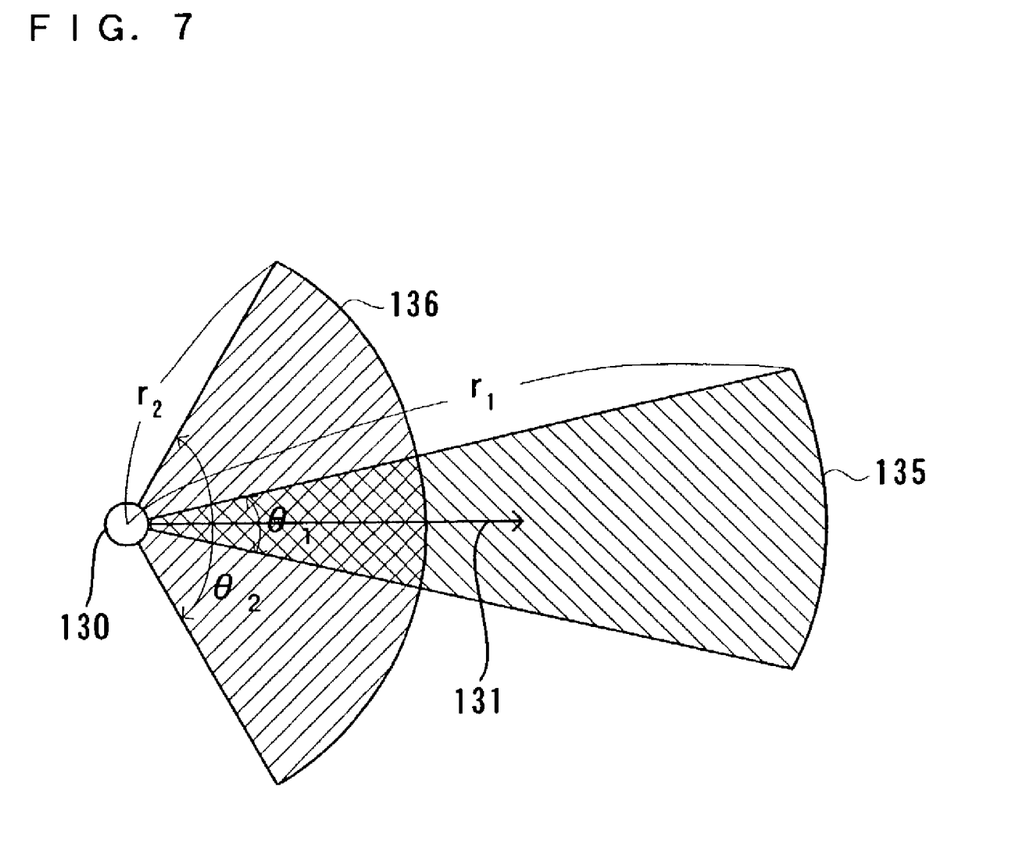
FIG. 7 is a diagram showing collision areas 135 and 136 for determining whether or not sliding tackle is successful.

Next, a description is given of a specific method for determining whether or not the sliding tackle is successful. FIG. 7 is a diagram showing collision areas 135 and 136 for determining whether or not the sliding tackle is successful.

Referring to FIG. 7, reference numeral 130 denotes a player character which sliding tackles the ball, and reference numeral 131 denotes a direction of the lever 11 which is inclined by the gamer who operates the player character 130. A "collision area" means that when the gamer kicks the pseudo ball 20 and issues an instruction for sliding tackling the ball, if the ball kept by the player character in the opponent team is included in the "collision area", the sliding tackle is successful, or if the ball is not included in the "collision area", the sliding tackle is not successful.

The two collision areas 135 and 136 shown in FIG. 7 are fan-shaped with the player character 130 as center, respectively. The collision area 135 has a radius $r_1$ and a central angle $\theta_1$, and the collision area 136 has a radius $r_2$ ($<r_1$) and a central angle $\theta_2$ ($\geq \theta_1$). When the gamer rotates the lever 11 on the plane, the collision areas 135 and 136 are rotated according to the rotation of the lever 11. The collision area 135 for a strong tackle corresponds to a "first collision area" in claims. On the other hand, the collision area 136 for a weak tackle corresponds to a "second collision area" in claims.

The determination of the strong tackle or the weak tackle depends on the kick power of the pseudo ball 20 kicked by the gamer or the kick speed. The video game machine 1 determines based on a predetermined level that when the pseudo ball 20 is kicked with a power lower than the predetermined level, the sliding tackle is a weak one, and when the pseudo ball 20 is kicked with a power higher than the predetermined level, the sliding tackle is a strong one. When the sliding tackle is the weak tackle, a replay time for which the player character tackles the ball on the screen is reduced. Thus, if the tackle is failed, time for which the player character shifts to a next operation is short. On the other hand, when the sliding tackle is a strong one, the replay time for which the player character tackles the ball on the screen is increased. Thus, if the tackle is failed, time for which the player character rises up and shifts to a next operation is long.

As shown in FIG. 7, a fan of the collision area 136 for the weak tackle has a large central angle and a small radius. Therefore, the sliding tackle can be a weak one by kicking the pseudo ball 20 with a power lower than the predetermined level, when the distance between the player character operated by the gamer and the player character in the opponent team, which keeps the ball, is exceedingly short. In this case, the collision area 136 having a large central angle of the fan is applied and, therefore, the inclined direction of the lever 11 necessary for the success of the tackle may be not so exact.

On the other hand, a fan of the collision area 135 for the strong tackle has a large radius and a small central angle. Therefore, the sliding tackle can be a strong one by strongly kicking the pseudo ball 20 with a power over the predetermined level, when the distance between the player character operated by the gamer and the player character in the opponent team, which keeps the ball, is not so short but the gamer strongly desires the sliding tackle. In this case, the collision area 135 for the strong tackle having a large radius of the fan is applied and, therefore, even if the distance between the player character operated by the gamer and the player character in the opponent team is so far, the tackle might be successful. However, since the central angle is small, high accuracy of the direction of the inclined lever 11 is required so as to make the tackle successful.

Although the collision area 135 is partly overlapped to the collision area 136 in FIG. 7, the video game machine 1 determines that the sliding tackle is successful in the overlapped portion, irrespective of the weak tackle or the strong tackle of the pseudo ball 20.

By determining, based on the set collision areas 135 and 136 having the different shapes in FIG. 7, whether or not the sliding tackle is successful, operations required for the gamer upon sliding tackle and risks thereof are exceedingly similar to operations required for a player upon sliding tackle and risks thereof in the actual futsal game or soccer game. Consequently, upon sliding tackling the ball on the video game machine 1, the feeling that the gamer really takes part in sports is further increased.

Figure 8:
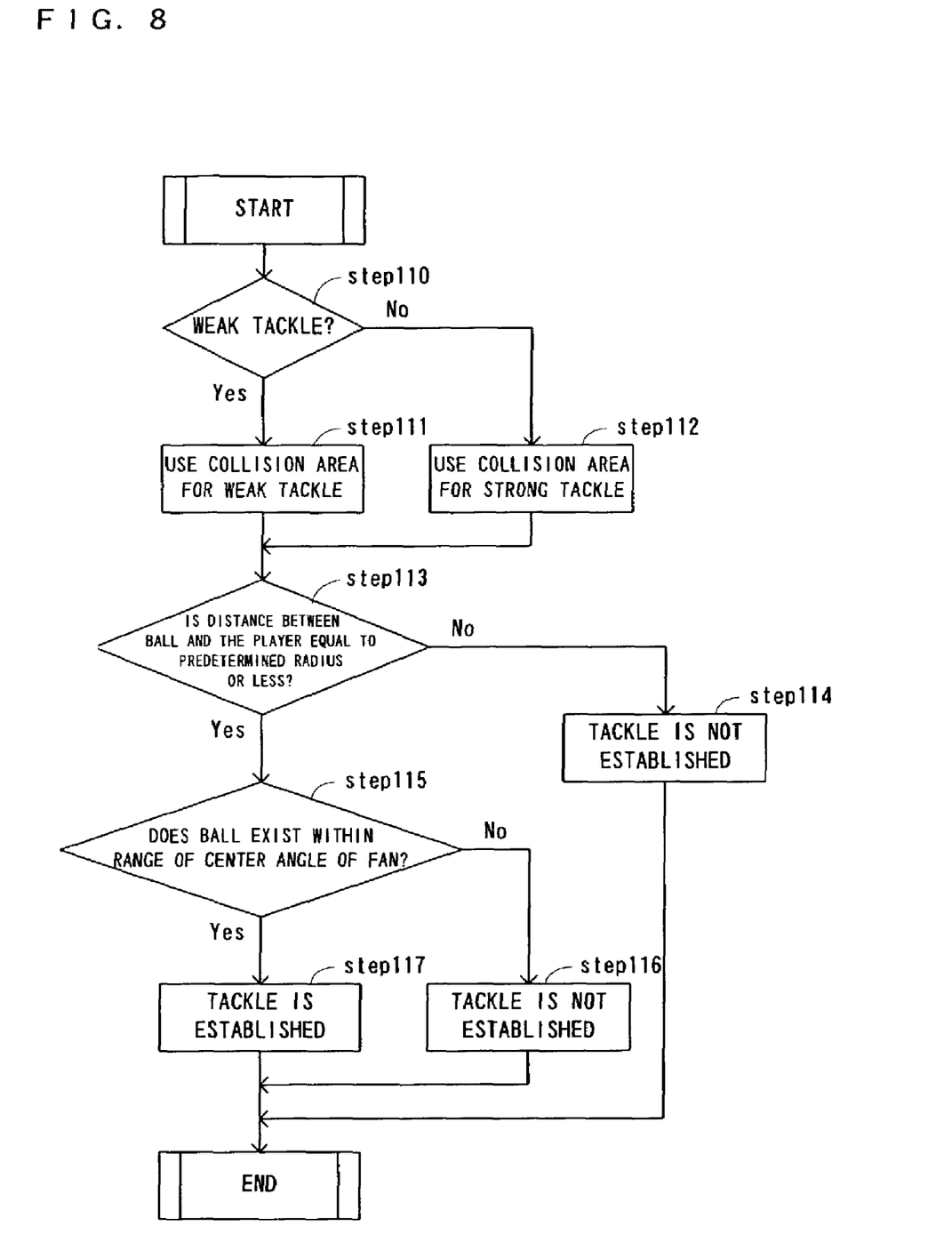
FIG. 8 is a flowchart showing processes for applying a predetermined collision area depending on a status, when an operation of the sliding tackle is requested to a CPU.

FIG. 8 is a flowchart showing processing for applying a predetermined collision area depending on the determination of the above-mentioned situations, when the operation of the sliding tackle is requested. When the CPU receives a request for the sliding tackle, first, it is determined, based on the kick power of the pseudo ball 20, whether the sliding tackle is a strong one or a weak one (step 110). If YES in step 110 (weak tackle), it is determined that the collision area 136 for the weak tackle is applied (step 111). If NO in step 110 (strong tackle), it is determined that the collision area 135 for the strong tackle is applied (step 112).

Next, it is determined whether or not the distance between the player character which sliding tackles the ball and the ball which is to be stolen by the tackle is equal to the radius of the applied collision area or less (step 113). If NO in step 113, the sliding tackle is not established (step 114). Necessary processing in this case is performed and the processing routine ends. In the "necessary processing", the player character, which sliding tackled the ball, is allowed to rise up.

On the other hand, if YES in step 113, it is sequentially determined whether or not the ball, which is to be stolen by the tackle, exists within a fan-shaped range of the central angle of the applied collision area (step 115). If NO in step 115, the sliding tackle is not established (step 116). Necessary processing in this case is performed and the processing routine ends. On the other hand, if YES in step 115, the sliding tackle is successful (step 117), necessary processing is performed and the processing routine ends. In the "necessary processing", the player character, which sliding tackled the ball, is allowed to rise up and the ball is newly kept by the player character.

The present invention is not limited to the above embodiments and can be variously modified within the spirit of the present invention. For example, the collision areas used for the determination of the success of the sliding tackle are fan-shaped in the above description and the radiuses and the central angles are different depending on the strong tackle and the weak tackle. However, the shape of the collision area is not limited to be fan-shaped. In summary, it is important that a plurality of collision areas are provided and the applied collision areas are changed depending on the operation contents of the gamer. When the collision areas are fan-shaped, only the radiuses of the fans of the collision areas may be different depending on the strong tackle or weak area, and the central angles of the collision areas may be similar. An overlapped portion of the two collision areas can be used as a collision area for one of the strong tackle and the weak tackle.

Although the present invention is applied to the video game machine of the game dedicated for the futsal, it can be applied to video game machines of any game, in which a plurality of player characters are separated into two teams and one team attacks a goal of the other team with a ball, for simulating the play for forcedly stealing the ball from the player character, which keeps the ball, in the one team by the player character in the other team, such as soccer, basketball, and handball.

In addition, the present invention can be embodied by recording a computer program for implementing the above-described game contents or functions to a recording medium. The recording medium includes a magnetic tape, a flexible disk, an optical disk such as a CD-ROM or DVD, a magneto-optical disk such as an MO, etc.

As stated above, according to the present invention, upon a play in which a ball is forcedly stolen from a player character, which keeps the ball, in one team, a plurality of collision areas for determining whether or not the play is successful are provided and the applied collision area is changed depending on the level of the play. Thus, the operations required for the gamer and the risk thereof during the play are similar to those of the play of the actual sport. Accordingly, the feeling that the gamer really takes part in sports can be increased during the game play.

INDUSTRIAL APPLICABILITY

As described above, the video game machine in the present invention can be used in wide fields of arcade video games which are installed to arcade game amusement centers, etc.

The invention claimed is:

1. A sport video game machine, comprising a computer, a display, and gamer inputs, for simulating a ball sport;
    wherein the computer generates a plurality of player characters on the display, wherein the player characters are separated into an offense team and a defense team, wherein the offense team attacks a goal of a defense team with a virtual ball, and wherein a size of a hit range used for collision determination of each player character with the virtual ball is changed depending on whether that player is on the offense team or the defense team;
    wherein at least two hit ranges having different sizes are set in advance, including a wide hit range in the offense that is applied to the player character in the offense team, which keeps the ball and attacks the goal of the other team, and a narrow hit range in the defense that is applied to the player character in the defense team, which is attacked by the offense team that keeps the ball.

2. A sport video game machine, comprising a computer, a display, and gamer inputs, for simulating the motion of a ball used for a ball sport in which a plurality of player characters are separated into two teams and one team attacks a goal of the other team with a ball, based on a dynamic equation including a friction factor as a parameter,
    wherein a normal friction factor is used when the moving ball is close to a pass target coordinate in the case in which the player character in the one team passes the ball to the player character in the same team, and the friction factor is switched to be a friction factor higher than said normal friction factor when the moving ball passes through the pass target coordinate.

3. A control method of a sport video game machine for simulating a ball sport in which a plurality of player characters are separated into two teams and an offense team attacks a goal of a defense team with a virtual ball, said method comprising steps of:
    changing the size of a hit range used for collision determination of each player character with the virtual ball, depending on whether that player is on the offense team or the defense team; further comprising the steps of:
    setting at least two hit ranges having different sizes in advance as said hit ranges;
    applying a wide hit range in the offense to that of the player character in the offense team, which keeps the ball and attacks the goal of the other team; and
    applying a narrow hit range in the defense to that of the player character in the defense team, which is attacked by the one team that keeps the ball.

4. A control method of a sport video game machine for simulating the motion of a ball used for a ball sport in which a plurality of player characters are separated into two teams and one team attacks a goal of the other team with a ball, based on a dynamic equation including a friction factor as a parameter,
    said method comprising the steps of:
    using a normal friction factor when the moving ball is close to a pass target coordinate in the case in which the player character in the one team passes the ball to the player character in the same team; and
    switching the friction factor to be a friction factor higher than said normal friction factor when the moving ball passes through the pass target coordinate in the case in which the player character in the one team passes the ball to the player character in the same team.

5. A computer-readable recording medium for recording a program of a sport game for simulating the motion of a ball used for a ball sport in which a plurality of player characters are separated into two teams and one team attacks a goal of the other team with a ball, based on a dynamic equation including a friction factor as a parameter,
    wherein said medium records the program which allows a computer to implement a function for:
    using a normal friction factor when the moving ball is close to a pass target coordinate in the case in which the player character in the one team passes the ball to the player character in the same team; and
    switching the friction factor to be a friction factor higher than said normal friction factor when the moving ball passes through the pass target coordinate in the case in which the player character in the one team passes the ball to the player character in the same team.

* * * * *